United States Patent [19]
O'Brien, deceased et al.

[11] 3,932,711
[45] Jan. 13, 1976

[54] TRANSMISSION OF VOICE OR SOUND THROUGH TELEGRAPHY

[76] Inventors: Gerard J. O'Brien, deceased, late of Jersey City, N.J.; Catherine H. O'Brien, executrix, 33 Pamrapo Ave., Jersey City, N.J. 07307

[22] Filed: Sept. 13, 1973

[21] Appl. No.: 396,758

[52] U.S. Cl. .............................................. 179/142
[51] Int. Cl.² ......................................... H04R 21/02
[58] Field of Search ............ 179/140, 141, 142, 143

[56] References Cited
UNITED STATES PATENTS

| | | | |
|---|---|---|---|
| 292,603 | 1/1884 | Waite | 179/142 |
| 297,168 | 4/1884 | Rogers | 179/142 |
| 852,646 | 5/1907 | Blake | 179/142 K |

FOREIGN PATENTS OR APPLICATIONS

| | | | |
|---|---|---|---|
| 3,405 | 11/1914 | United Kingdom | 179/142 |

*Primary Examiner*—Kathleen H. Claffy
*Assistant Examiner*—C. T. Bartz
*Attorney, Agent, or Firm*—Lackenbach, Lilling & Siegel

[57] ABSTRACT

A vibration transducer, comprising a conductive member, such as a weighted carbon bar loosely fitting into support means, such as a pair of carbon bearing blocks with the bearing blocks rigidly attached to a flexible membrane, serves as the transmitter of the voice transmission system. The bearing blocks are series wired into an electrical circuit, including a direct-current power source and a loud-speaker coil. A fluctuating pressure signal sets the flexible membrane into vibration and causes the weighted carbon bar to bounce in its bearings, thereby alternately interrupting and closing the electrical circuit. The pulsed DC signal passing through the loud-speaker coil reproduces the motion experienced by the transducer membrane in the motion of the loud-speaker cone thereby reproducing the input sound pattern.

16 Claims, 29 Drawing Figures

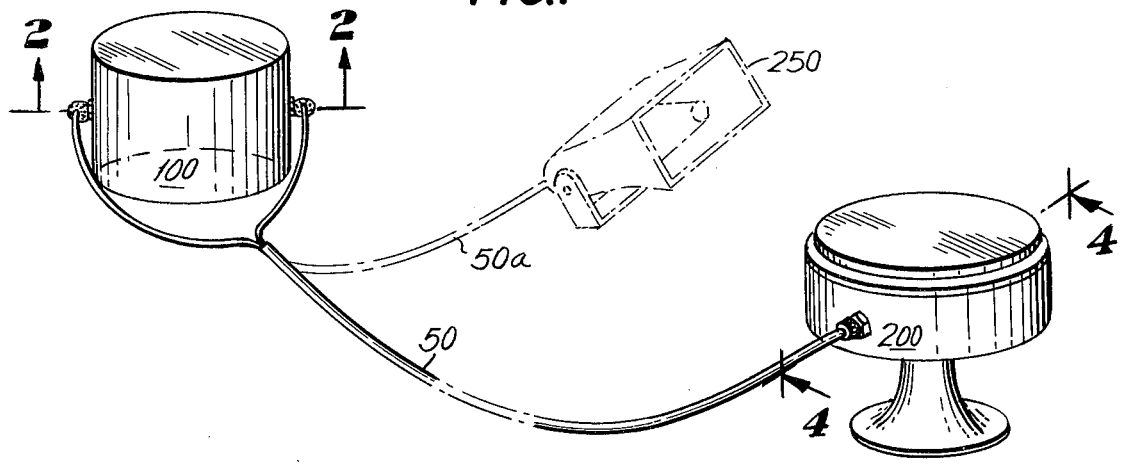
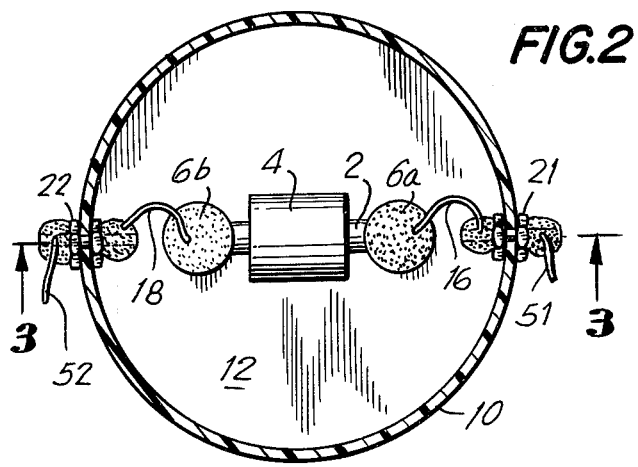
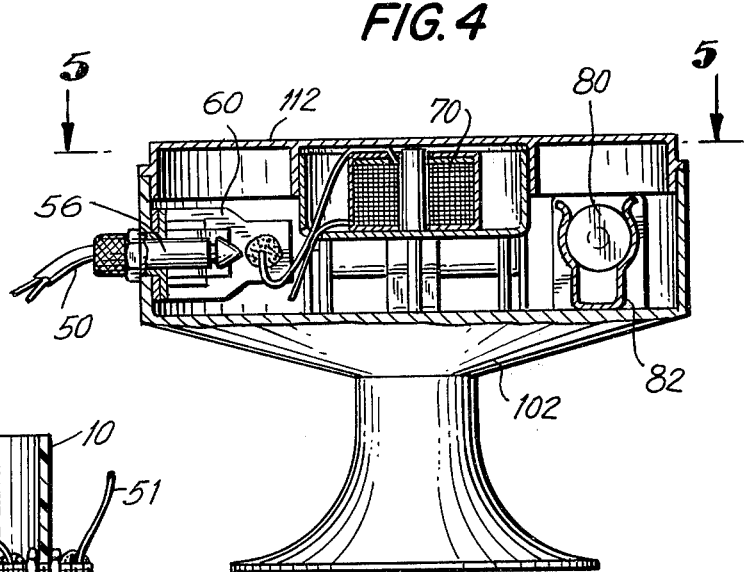
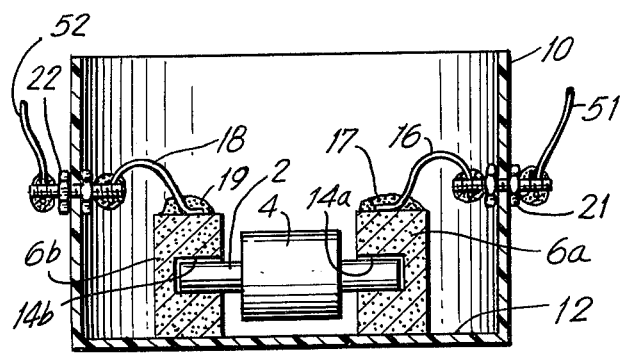

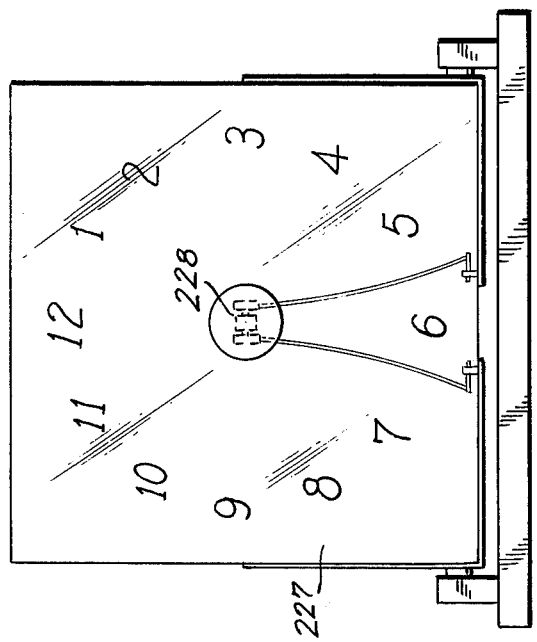
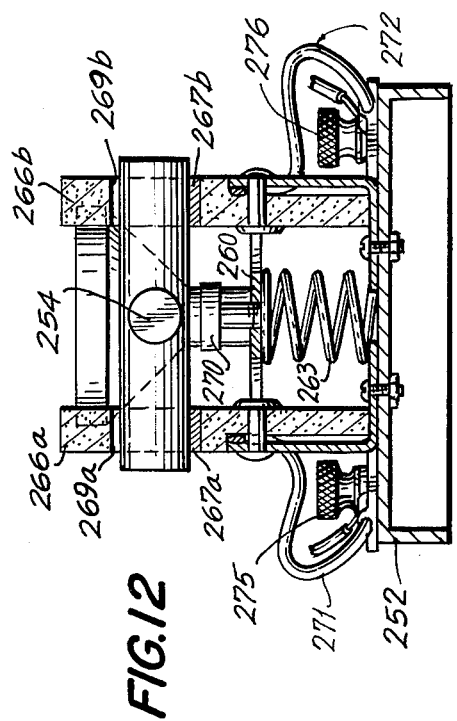
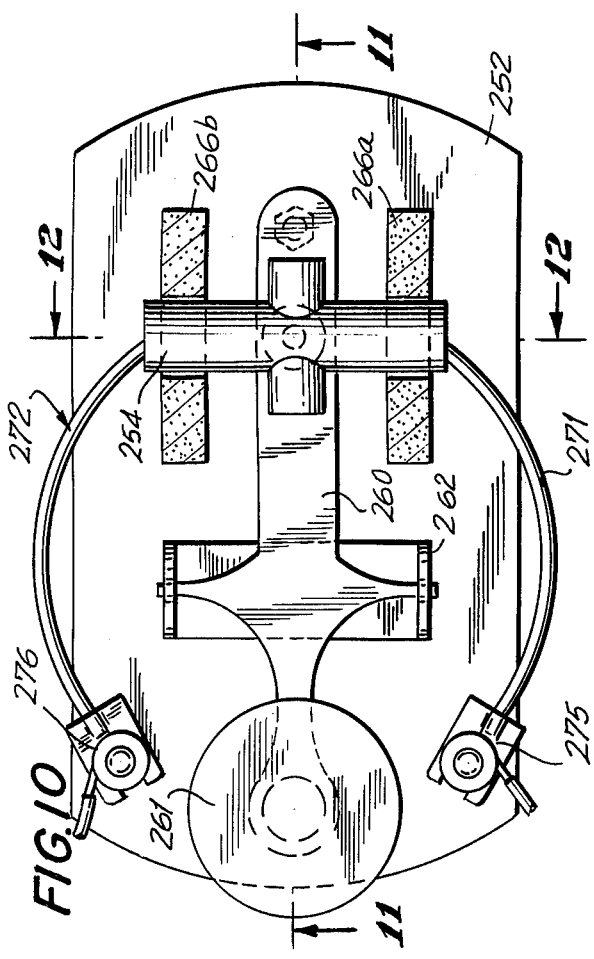
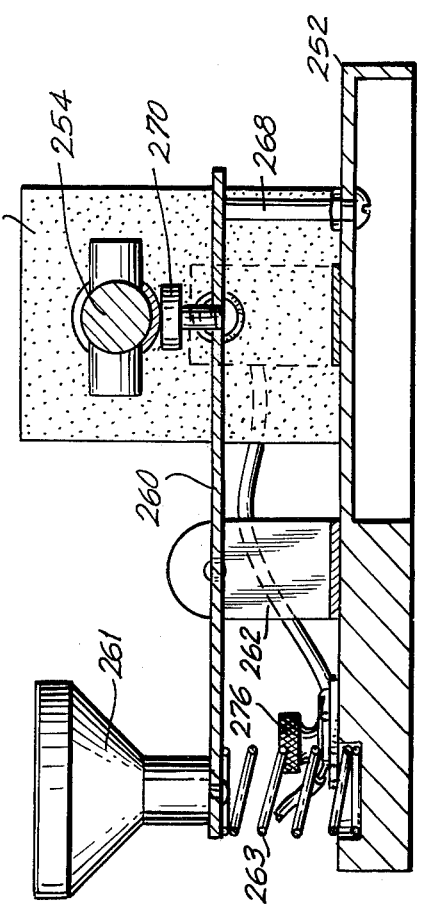

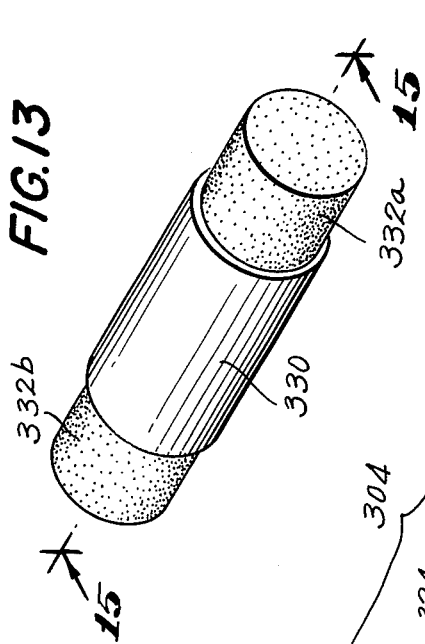
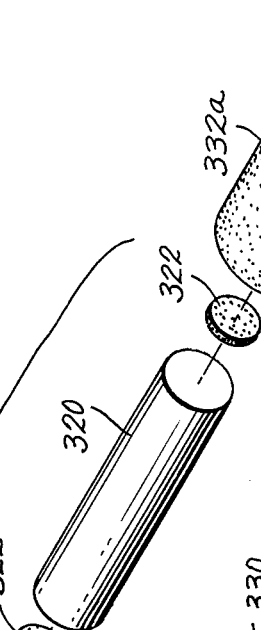
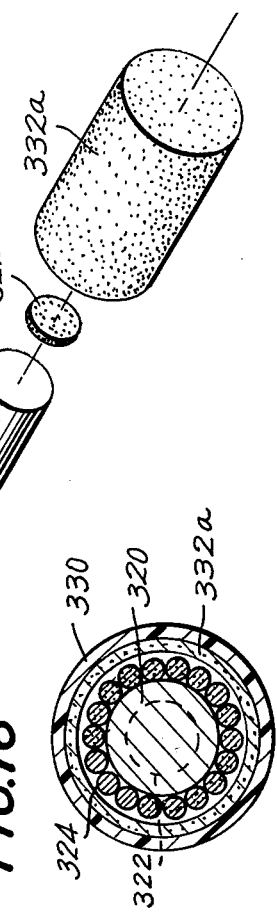
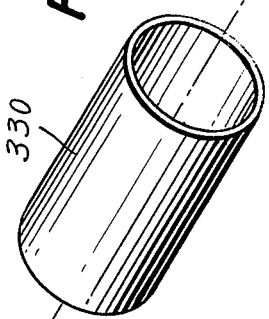
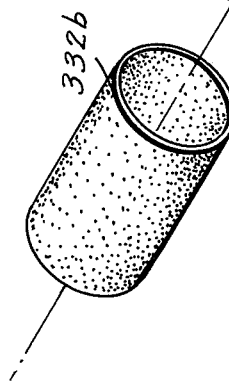
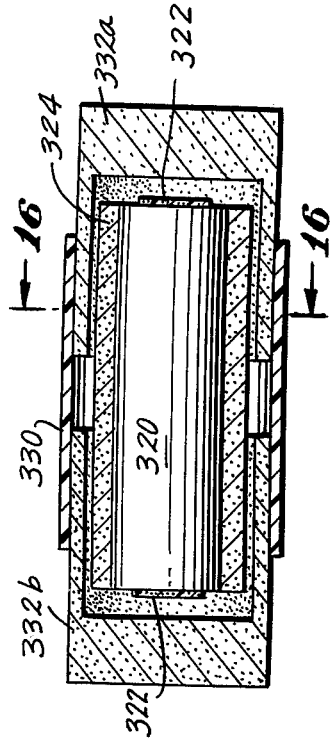
FIG.13
FIG.14
FIG.15
FIG.16

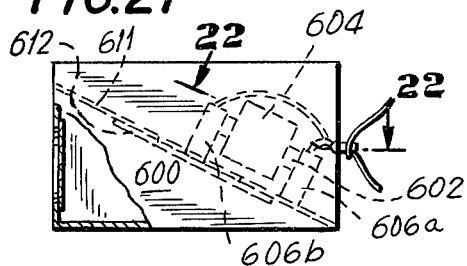
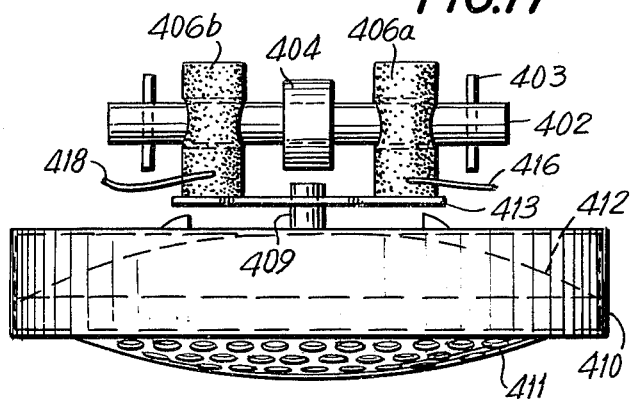
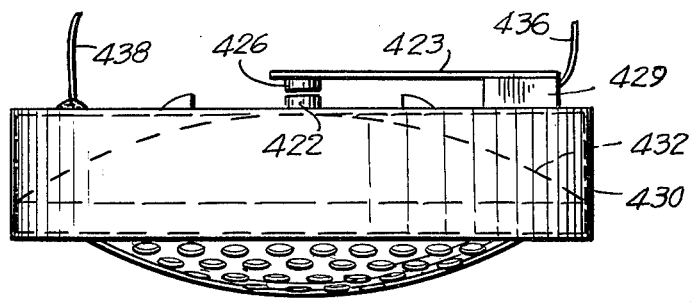
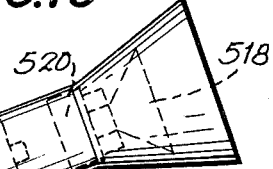
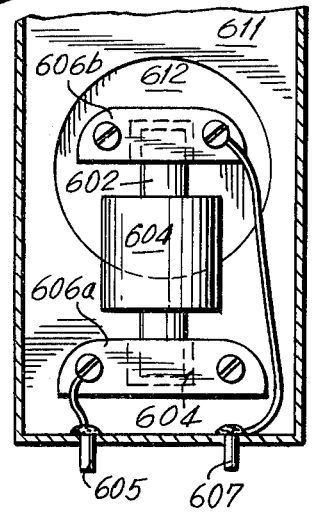
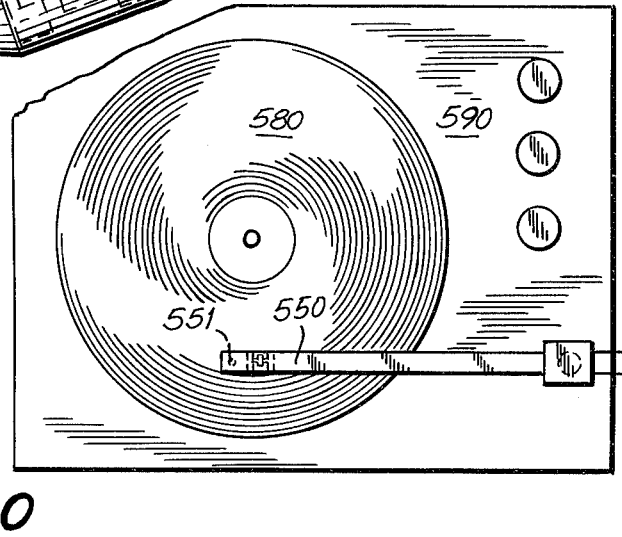

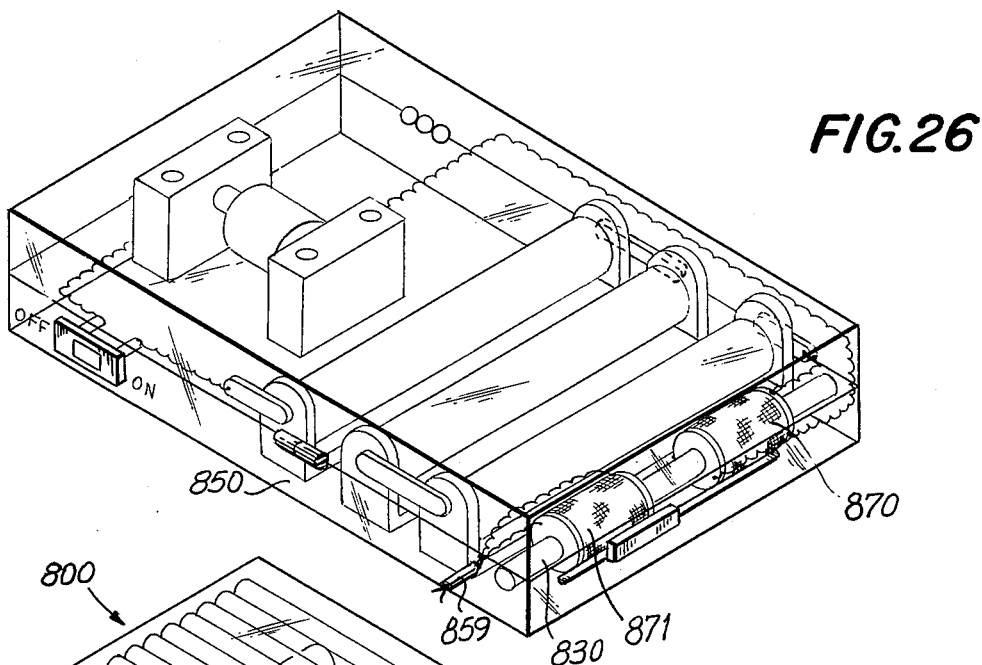
FIG.26
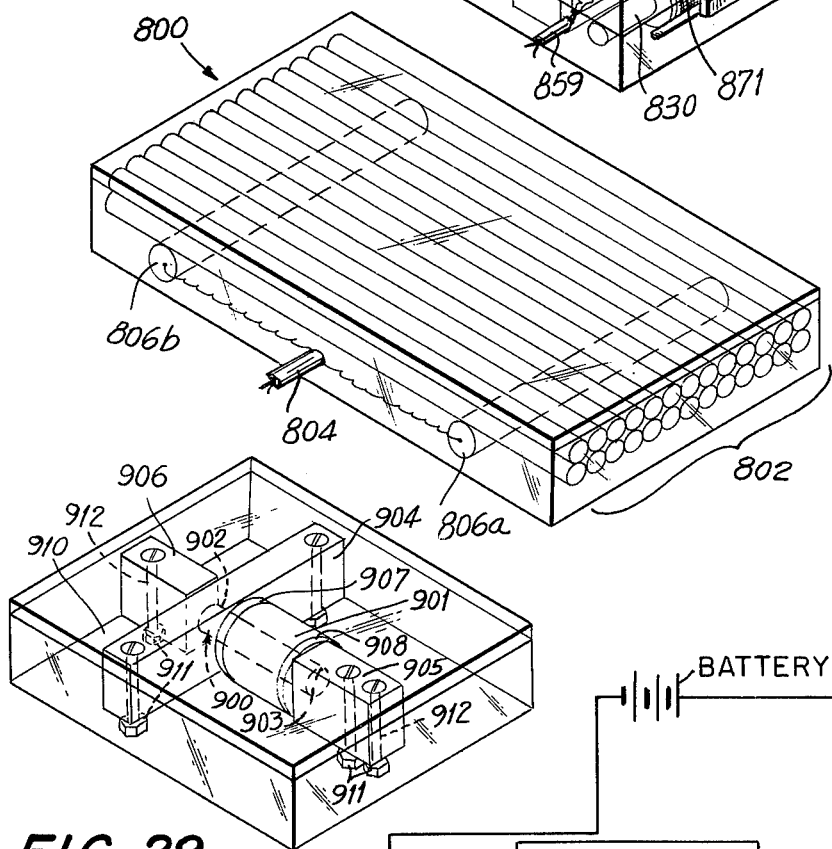
FIG.27
FIG.29
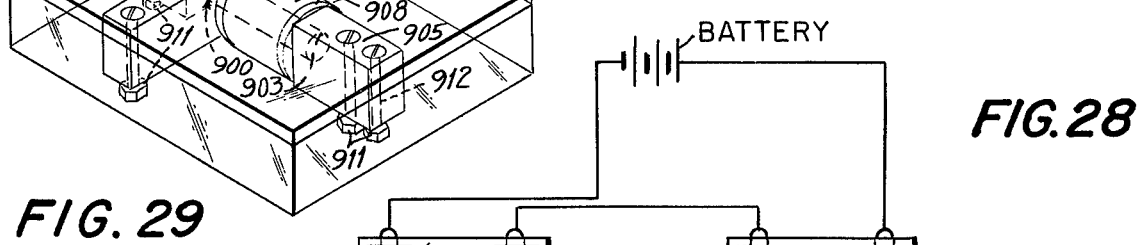
FIG.28

TRANSMISSION OF VOICE OR SOUND THROUGH TELEGRAPHY

BACKGROUND OF THE INVENTION

The invention accordingly relates generally to voice transmission systems in which the pressure fluctuations induced by speech are first converted to an electrical signal by a transducer, transmitted through a pair of wires, and resolved into audible sound by means of a solenoid — through which the transmitted electrical signal is caused to pass — acting upon a flexible membrane.

The invention relates more particularly to devices in which the transmitted signal is a train of pulses of similar amplitude.

Sound transmitting devices of the prior art do not, in general, operate in this manner. Most commonly the transmitted signal corresponding to a continuously varying sound input is an analogous, continuously varying voltage.

Where transmission occurs in a pulsating current — as in Pulse Code Modulated telephone transmission — the receiver and speaker still operate on continuously varying signals, the PCM encoder and decoder being interposed between the ultimate terminals.

It is a primary object of the invention to provide a voice-grade transmission system in which the sound input is converted directly into a pulsed current, transmitted as such through a pair of wires, and resolved into coherent speech at the receiver.

It is a further object of the invention to provide a transmission system requiring no electronic components and operating entirely in a telegraphic mode from a direct-current power source.

It is yet another object of the invention to provide a telegraphic voice transmission system of relative structural simplicity, one which is economical in manufacture, reliable in operation and one which is easy to operate or use.

SUMMARY OF THE INVENTION

The telegraphic voice transmission system of the instant invention employs a flexible soundboard, or membrane, as the detector of speech-induced pressure fluctuations in the air. A metastable, bouncing contact switch, hereinafter referred to as a "tap transducer", is mounted on the soundboard. The tap transducer preferably comprises a semi-conductive bar, such as a bar of graphite or carbon, suitably weighted and supported in a pair of bearing supports. The bar is provided with a loose fit in the bearing supports, to the extent where it is free to lift off the bearing surfaces but is prevented, by means of a separate retainer or other restraining or caging means where required, from completely disengaging therefrom.

When the soundboard vibrates under the influence of an imposed sound signal, the weighted bar of the tap transducer begins to bounce in its supports, alternately touching the bearing seats and losing contact with them. If a direct-current circuit is established across the bearing supports, which are electrically insulated from the soundboard, the bar will act as a switch and alternately make and break the circuit. The resulting signal is a train of pulses whose frequency of occurrence and duration is governed by the motion of the bar under the influence of the exciting speech signal.

With a loud-speaker coil series connected into the circuit, the pulsed voltage across its terminals will generate a motion in the speaker diagram closely corresponding to the motion of the transducer membrane and reproducing the same sound signal.

In the simplest form of construction, a membrane similar to the transmitting device membrane may be made subject to the influence of an electromagnet in the circuit and will serve as the output transducer of the transmission system.

Apart from its utility in the transmission of voice signals — in intercom systems, toys, telephones and the like — the tap transducer of the invention may also be used for other purposes; such as for noise and vibration detection, seismography, deflection sensing in balancing machines and many other industrial detector applications are possible.

The basic construction of the tap transducer and of the telegrahic voice transmission system will become apparent upon reading the following specifications and referring to the accompanying drawings of, which form a material part of this disclosure.

The invention accordingly consists in the features of construction, combination of elements, and arrangements of parts, which will be exemplified in the construction hereinafter described, and of which the scope will be indicated by the appended claims.

BRIEF DESCRIPTION OF THE ACCOMPANYING DRAWINGS

FIG. 1 is a top perspective view of the transmitting and receiving devices of the transmission system of the present invention with their interconnecting cable;

FIG. 2 is a cross-sectional view of the transmitter device taken generally along the line 2—2 of FIG. 1;

FIG. 3 is a transverse sectional view of the transmitter device, taken along the line 3—3 of FIG. 2;

FIG. 4 is a transverse sectional view of the receiving device shown in FIG. 1, taken along the line 4—4 thereof;

FIG. 9 is a frontal view of a tap transducer incorporated into a clock faceplate, converting same into a transmitter for use in the voice transmission system of the invention;

FIG. 10 is a plan view of a combination telegraphic sending device and voice signal transmitter;

FIG. 11 is a sectional view of the embodiment of FIG. 10, taken along the line 11—11 of FIG. 10;

FIG. 12 is a transverse sectional view, taken along the line 12—12 of FIG. 10;

FIG. 13 is a perspective view of a tabular tap transducer adapted for use in the transmitting device of the invention;

FIG. 14 is an exploded view of the components of the embodiment of FIG. 13;

FIG. 15 is a transverse sectional view of the tabular tap transducer, taken along the line 15—15 of FIG. 13;

FIG. 16 is a transverse sectional view of the tap transducer of FIG. 13, taken along the line 16—16 of FIG. 15.

FIG. 17 is a side view of a further embodiment of the transmitting device of the invention;

FIG. 18 is a side view of a transmitting device employing a vibrating contact pair as tap transducer;

FIG. 19 is a side elevational view of a vibration detector, the inwards of which are shown in broken lines, which may be substituted for the transmitter of the telegraphic transmission system;

FIG. 20 is a schematic illustration of a record player utilizing a tap transducer in the pick-up arm;

FIG. 21 is a transverse sectional view of a transmitter with a laminated soundboard;

FIG. 22 is a sectional view of the embodiment of FIG. 21, taken along the line 22—22 thereof;

FIG. 26 is an isometric view of a transmitter of the invention provided with means for varying the intensity of the transmitted signal and adapted for use in conjunction with electronic signal amplifiers;

FIG. 27 is yet another transmitter of the invention, employing a planer array of switching bars in the tap transducer;

FIG. 28 is a schematic representation of an electrical circuit embodying a pair of tap transducer series connected in the circuit of FIG. 25 without the need of an electro-magnet; and FIG. 29 is a perspective view of another alternate embodiment of the transmitting and receiving device of the invention.

DESCRIPTION OF THE PREFERRED EMBODIMENT

Figure 5:
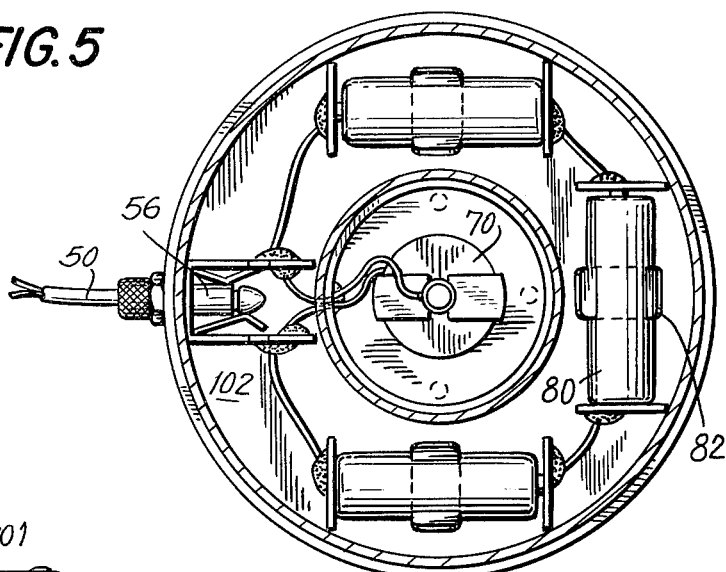
FIG. 5 is a cross-sectional view, of the receiver device taken along the line 5—5 of FIG. 4.

The telegraphic voice transmission system shown in FIG. 1 comprises a transmitter 100, a receiver 200, and an intermediate transmission cable 50. The receiver 200 may be replaced by a loud-speaker 250, such as a 25 watt speaker coil, connected to the transmitted 100 by a cable 50a, as shown in dotted outline.

As best shown in FIGS. 2 and 3, the transmitter 10 comprises a cylindrical cup-shaped housing 10 having a top surface or an integral membrane 12, serving simultaneously as the cover of the transmitter 100 and as the vibrating soundboard of the tap transducer. The housing 10 and the cover 12 are constructed from a rigid, non-conductive plastic material, permitting the direct mounting of a pair of bearing supports, 6a and 6b, to the latter. The bearing supports are suitably made of a carbonaceous material and are provided with blind bearing orifices 14 which support the ends of a shaft 2. The shaft 2 is also suitably made from a carbonaceous material and is provided with a very loose fit in the orifices 14. The shaft 2 is also suitably provided with a weight 4, preferably cylindrical in form midway along its span, which weight tending to hold the shaft 2 firmly against the bearing blocks.

Interconnection of the tap transducer — comprising membrane 12, bearing supports 6, and weighted shaft 2 — with transmission cable 50 is through terminals 21 and 22, protruding through the wall of housing 10. The terminals are, in turn, connected to the bearing blocks 6 by means of wires 16 and 18; electrical and mechanical contact being ensured by glue beads 17 and 19, respectively.

The transmitter 100 may be used in a hand-held mode, or it may be placed upon a supporting surface, such as a table. The pressure fluctuations comprising the input sound signal set the membrane 12 into motion, entraining bearing supports 60 and causing the shaft 2 to oscillate in the cavity formed by the oversize bearing orifices 14, thereby intermittently interrupting the electrical path between terminals 21 and 22.

The frequency response of the tap transducer is governed by the vibratory characteristics of the membrane 12 and the mass of the shaft 2, with its integral weight 4. Experiments have demonstrated that satisfactory transmission of speech signals can be achieved within a wide range of membrane size and material. Typical dimensions are between 2 and 6 inches and materials range from steel to hard plastics; an equally wide range of shaft mass may be employed, typical weights lie between 1/10th of an ounce and 1 ounce.

It should be noted that the rod or bar element of the tap transducer of the invention may be of metal, such as ferrite or a carbonaceous material or other semiconductor. However, a metallic rod generates more frictional resistance causing greater noise levels; whereas a semi-conducting material, such as carbon and graphite, substantially reduces friction and noise. A metallic element generally will generate a louder signal inasmuch as its conductivity is higher than that of a semi-conductor. Thus, carbonaceous material suppresses noise which may be induced by varying contact pressure between the shaft 2 and the bearing slate 14, and it is recognized that since the nature of such material tends to provide clean output signals they are more preferred.

Figure 25:
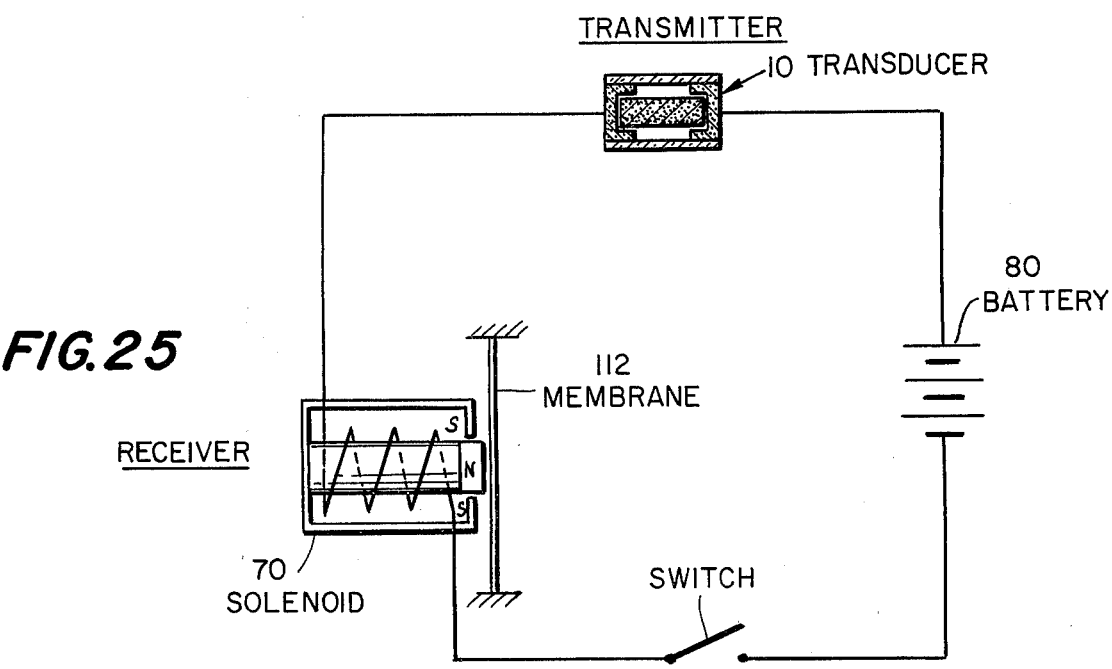
FIG. 25 is a schematic representation of the electrical circuit of the transmission system of the invention.

The receiving device 200, of the telegraphic voice transmission system of FIG. 1, is shown in detail in FIGS. 4 and 5. The cable terminates in a jack 56 and is inserted into a socket 60 through which the electrical circuit of the transmitter, more fully described with reference to FIG. 25, is completed. A cylindrical housing 102 is capped by a membrane 112 whose motion generates the reconstituted sound signal; the membrane 112 is driven by a solenoid coil 70 whose poles, when the coil is energized, exert a magnetic force upon the membrane, whose material is ferromagnetic in nature. The housing 102 also serves as the container of the direct current power supply for the transmission system; it consists of three dry-cell batteries 80, held in clips or suitable cradle clamps 82. The circuit elements are connected in series so that, when no signal is received at the soundboard of the transmitter 100 and the shaft 2 is resting in its bearing supports 6, a current flows through the solenoid 70 and attracts the membrane 112 toward the solenoid poles. Whenever the motion of input membrane 12 forces the shaft 2 out of contact with its supports, the circuit is broken and the attractive force of the output membrane 112 removed. The vibratory motion of the membrane 112 as it is pulled toward the solenoid and then relaxed from its strained condition reproduces the motion of the input membrane 12 and, consequently, recreates the sound patterns reaching the latter. The electrical schematic of FIG. 25 represents the devices shown in FIGS. 3 and 4 and shows these to be in series connection with the battery and suitable switch means.

It will be appreciated as noted hereinbefore, a battery-powered loud-speaker 250 may be substituted for the receiver 200, as shown in FIG. 1.

Figure 6:
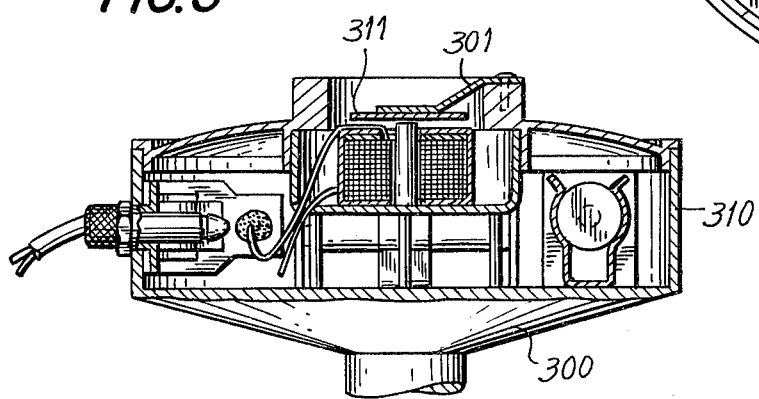
FIG. 6 is a transverse sectional view of an alternate receiver, particularly adapted to the reception of Morse-code.

A conventional telegraphic clapper receiver 300, as best shown in FIG. 6, may also be substituted for the receiving device 200. The output element of the receiver 300 is an iron disk 311, cantilevered on a spring 301 from housing 310. The receiver 300 may be used for Morse-code signals, or in applications where the transmitter 100 serves as a vibration detector; its frequency response is, generally, not adequate for the reproduction of voice signals.

Figure 7:
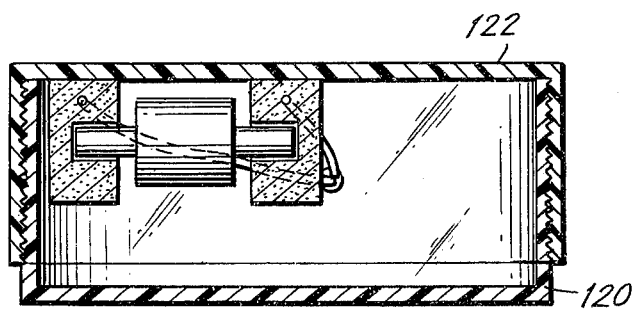
FIG. 7 is a transverse sectional view of an alternate embodiment of a transmitting device of the invention.

Another embodiment of the transmitter 100 is illustrated in FIG. 7. Two cylindrical cups 120 and 122 are suitably joined, such as by means of mating threads at their peripheries. The base of cup 122 serves as the signal acceptance membrane and has the tap transducer secured to its inner surface.

Figure 8:
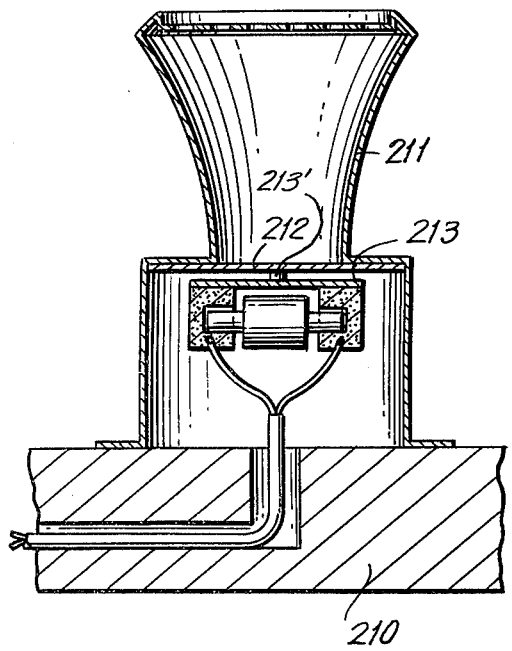
FIG. 8 is another transverse sectional view of an embodiment of the transmitter of the invention, provided with a directionally sensitive mouthpiece.

FIG. 8 shows yet another transmitter, distinguished by a voice-cone 211 above its membrane 212; the tap transducer is in this particular application suspended from the latter on a mounting plate 213 by means of a single reference joint 213. The voice-cone 211 serves, simultaneously, to increase the acoustic energy reaching the membrane 212 and to attenuate sounds originating away from its axis.

Since any sounding board may serve as part of a tap transducer assembly, the transmitter of the system may be incorporated into a number of devices commonly employed for other purposes. A device of this type is illustrated in FIG. 9; a tap transducer 228 is mounted against the face plate 227 of a free-standing clock (illustrated with the clock hands). The plastic face plate acts as the driving membrane for the tap transducer 228, and converts the clock into an effective microphone — in an office intercom system, for example — when coupled to a receiver of the instant invention.

FIGS. 9, 10 and 11 show a transmitter incorporated into a conventional telegraph-key sending device, permitting its utilization for code and voice transmission at the operator's option.

A key 260, with its integral finger-button 261, is supported in cradle 262 on a plastic base 252. The base 252 also serves as the sounding board for a tap transducer comprising bearing supports 266a and 266b and a weighted graphite bar 254. A spring 263 is interposed between the key 260 and the base 252, near the button 261, to bias the far end of the key against an adjustable stop 268 affixed to the base 252. A cam 270 is also mounted on the upper surface of the key 260, between the bearing 266, and its elevation may be adjusted, by means of stop 268, so that it is just clear of the weighted bar 254. The electrical circuit is established by means of cables 271 and 272, connecting terminals 275 and 276 with the bearing supports 266a and 266b respectively. The bar 254 is a loose fit in orifices 269 in the bearing supports 266 and rests upon insulating inserts 267a and 267b at either end. Whenever the telegraph button 261 is depressed the cam 270 lifts the bar 254 from the insulating inserts 267 and brings it into contact with the bearing supports 266. The electrical circuit between terminals 275 and 276 is closed thereby and the circuit is powered by a DC source as in conventional telegraphy.

If the aforementioned telegraph circuit is modified to include a receiver of the telegraphic voice transmission system, suitably the embodiment illustrated in FIG. 5, the transmission of voice messages is made possible by the incorporation of a tap transducer into the telegraph key; inverting the key and using the base 252 as a mouthpiece permits the imposition of an acoustic driving signal on the circuit formed by the bearing supports 266 and the bar 254 and its reception and rebroadcast through the membrane 112.

FIGS. 13 through 16 show the detailed construction of a composite weighted carbon bar 304, adapted for use in a tap transducer suitable for incorporation into the telegraphic voice transmission system of the invention. The bar 304 consists of a large number of small carbon or graphite rods 324 arrayed around the periphery of a cylindrical weight 320. The weight 320 may be a conductor or an insulator, but in the former type of construction, insulating means such as nonconductive discs, or a pair of insulating drops, such as an adhesive or glue drops, suitably hardened to a mass 322 are applied at the ends of the weight 320 to prevent electrical contact with supports. 332.

The supports 332a and 332b are analogous to the bearing supports described with reference to other embodiments of the tap transducer; that is, they are made from carbon, axially aligned by means of sleeve 330, and they entrap the weighted bar 304. The cup-like sections of the supports 332 form a cavity, in conjunction with the sleeve 330, in which the components of the bar 304 are a loose fit and in which they are free to bounce under the influence of vibratory excitation transmitted from a soundboard through a rigid structure gripping the outer surfaces of the supports 332.

In function the embodiment of FIG. 14 may be considered analogous to a large number of smaller tap transducers operating in parallel. Experience has shown that such multiple embodiments generally show better fidelity at the higher input frequencies, at the expense of output power. Increasing the mass, on the other hand, tends to improve fidelity at low frequencies, also at the expense of transmitted signal strength. Single-conductor transducers are strongly preferred for the transmission of ordinary conversation, a use in which a relatively narrow bandwith only is required.

FIG. 15 is a cross-section through the complete multiple-conductor tap transducer assembly, omitting only the cables which interconnect the supports 332 into the electrical circuit of the transmission system. It shows the composite bar 304 in motion, midway between the upper and lower boundaries of the cylindrical inner surfaces of the supports 332; in the absence of any input forces the bar would rest at the bottom of the support cavity.

FIG. 17 shows a transmitter adapted for incorporation into a hand-held instrument, analogous to a telephone receiver, in elevation. A cylindrical housing 410 supports a perforated guard 411 and a curved diaphram 412 and the apex of the diaphram 421 carries a standoff 409 and an insulating plate 413 on which bearing supports 406 are mounted. The bearing supports are suitably made from carbon and are provided with coaxial cylindrical orifices in which a bar 402, also suitably made of carbon, is entrapped by means of pins 403. A weight 404 ensures good surface contact between the exterior of the bar 402 and the orifices in which it is provided with a loose fit. Conductors 416 and 418, attached to bearing supports 406a and 406b respectively, complete the transmitter assembly.

A simplified transmitter is shown in FIG. 18, with the tap transducer incorporating a pair of contact buttons 422 and 426; the former on the vibrating surface of a diaphram 432 and the latter attached, via mounting block 429 and cantilever 423, to the housing 430. As the sound input forces the diaphram 432 to vibrate along its axis of symmetry, the contacts 422 and 426 alternately touch and separate, thereby interrupting a direct-current circuit established across them by means of leads 436 and 438.

A vibration detector based on the tap transducer of the invention is illustrated in FIG. 19. A substantially cylindrical housing 500 is provided with a conical nose from which a needle 501 protrudes. The needle 501 serves as the vibration pick-up when pressed against a body whose motion is to be monitored. The needle 501 is connected to a support 521 which transmits any vibration sensed by it to a tap transducer assembly 515, which, in turn, is incorporated into a DC circuit powered by batteries 525 and 526. A solenoid 520 is also in the circuit and drives a conical diaphragm 518 in a flared-out portion of the housing 500. The intensity and pitch of the sound issuing from the diaphragm 518 is a measure of the amplitude and frequency of the vibration experienced by the monitored body. Such an instrument is readily used to isolate the offending portions of complicated machinery in which some parts may be acting as noise sources; touching the several components will reveal which is active and which is not.

A similar device, acting as the pick-up for a record player 590, is illustrated in FIG. 20. A needle 551 is mounted orthogonal to an elongated tone-arm 550, and a tap transducer is mounted in the tone-arm near such needle and experiences motion in a vertical plane as the arm tracks over the groove in a record 580. The tap transducer is connected into an electrical circuit which includes a DC source 575 and a solenoid-driven speaker 568. In such a device, the tap transducer can be mounted anywhere along the length of the tone-arm or even be slidably disposed so as to be positioned where the best results are achieved. In this regard, the weight on the bar element may be adjustable so as to also achieve best results.

A tap-transducer, suitable for either vibration monitoring or the transmission of voice-grade signals, is shown in FIGS. 21 and 22. A rectangular sound-box 600 is divided into two compartments by a diagonal, composite membrane comprising superimposed sheets 611 and 612. The membrane 612 is made from an electrically insulating material. Membrane 611, which may be an insulator or a conductor, is provided with a circular cut-out where a bearing support 606b is mounted to sheet 612, and the other bearing support 606a is affixed to membrane 611. The two bearing supports 606 are provided with blind, coaxial orifices 609 facing one-another. A rod 602, held by a weight 604, is entrapped in the bearing orifices 609. The supports 606 are suitably constructed from graphite, the rod 602 is suitably brass. The two bearing supports 606 are connected to electrical terminals 605 and 607 to form a series circuit through the rod 602; and the circuit is interrupted every time the motion of the composite soundboard causes the rod to leave one or the other of the bearing seats formed by the orifices 609.

Figure 23:
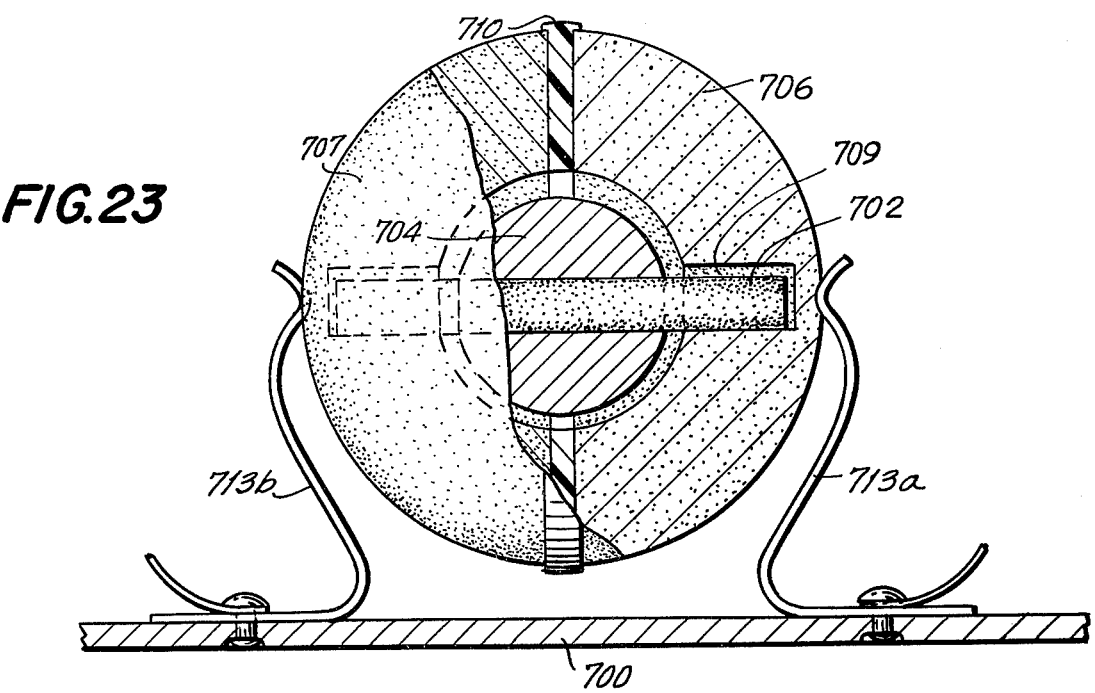
FIG. 23 is an end view, partially in section, of a tap transducer adapted for service in an industrial environment.

A form of tap transducer particularly adapted for use in industrial environments, where dust and liquid-tight construction is generally required, is shown in FIG. 23. In such construction, supports 706 and 707 are hemispherical bodies, suitably of carbon provided with hemispherical cavities on their inner surfaces and with blind orifices 709 along a path orthogonal to their plane of separation. The two supports form a completely enclosed sphere in conjunction with an interposed insulating washer 710 and they entrap a bar 702 which is a loose fit in the orifices 709. The bar 702 carries a spherical weight 704, somewhat smaller in diameter than the cavity formed by the supports 706 and 707. Two curved springs 713 engage the support halves and provide both the force required to keep the assembly intact, and sealed, and electrical contacts to the external circuit. The springs 713 are mounted on a base-plate 700 which is an insulator.

Figure 24:
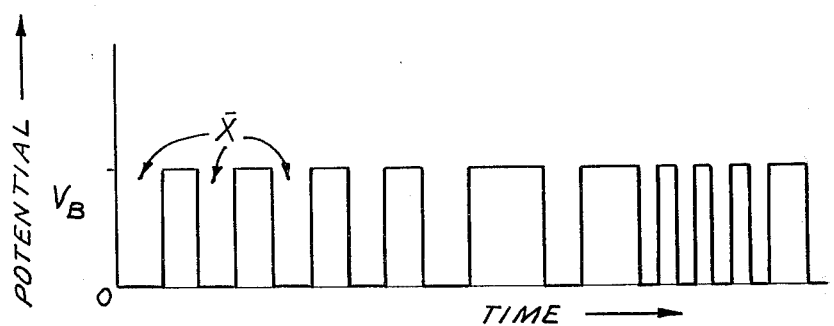
FIG. 24 is a graphical representation of the signal generated by the tap transducer of a telegraphic voice transmission system.

FIG. 24 is a simplified graph of a signal produced by a tap transducer when subjected to a vibratory input and FIG. 25 is a schematic representation of the electrical circuit of the invention. The potential $V_B$ represents the voltage of the direct-current power source in the circuit, this potential is applied across the terminals of the receiving device — the solenoid coil 70 of FIG. 4, for example — whenever input excitation is absent. Should an upward force of sufficient magnitude be imposed on the bearing supports of the tap transducer, the bar lifts off the bearing seat and the current flowing therethrough is interrupted, causing the potential at the receiver terminals to drop to zero - this condition is represented in FIG. 24 by the regions 'X'.

Having left the bearing seat, the bar of the tap transducer becomes independent of the vibratory input applied to the bearing supports and is only subject to the inertial loads previously transmitted to it and to the gravitational force of the earth. The bar will, therefore, after a lapse of time — the duration being dependent on the relative magnitude of the above forces — again seat itself on the bearing support, thereby re-establishing the circuit and causing the potential $V_B$ to appear, once more, across the receiver terminals. The relative durations of the two states of the bar — on or off the supports — depends on the amplitude and frequency of the applied vibration, on the physical characteristics of the input membrane, and on the construction of the tap transducer itself.

In FIG. 28, there is illustrated in generally schematic form a D.C. circuit embodying a pair of tap transducers in series, which operate without the need of an electromagnetic coil. Thus, one tap transducer can be used to transmit a signal directly to another tap transducer, for signalling another or for speech transmission as with an intercom system, and in this connection, it has been noted that by increasing the D.C. power, the transmitted sound or signal becomes greater or louder.

FIG. 27 is another embodiment of a tap transducer utilizing a multiplicity of switching bars; in contrast to the cylindrical arrangement shown in FIG. 14, a planar configuration is used here. A rectangular plastic container 800 has a pair of support bars 806 placed transversely across its bottom; a large number of switching bars 802 is placed across the support bars in the manner of cordwood. A clearance space is provided between the upper surface of the stacked bars 802 and the cover of the container 800 to permit the motion of the switching bars; a cable 809 provides electrical connection to the transverse support bars 806a and 806b.

FIG. 26 shows an embodiment of the transmitter of the instant invention particularly adapted to be connected to an electronic amplifier. The circuits heretofore described are not adapted to such use since the essentially direct current nature of their output signal cannot be amplified by conventional electronic devices. A tap transducer is shown mounted in a container 850, along with a number of batteries connected in series, an on-off switch and a modulator assembly. The latter is essentially an isolation transformer with a central core 830, a receiving solenoid 870 and an output coil 871. The output coil and the receiving solenoid are similar in construction but the coil 871 is slidably arranged on the core 830 so that its distance, and hence the magnetic coupling, with respect to the solenoid 870 may be altered. The modulator assembly performs two functions simultaneously, it abstracts the average, or D.C. component of the signal generated at the tap transducer and it enables the user to reduce, or increase, the intensity of the output signal by moving the output coil 871 farther, or closer, to the fixed solenoid 870.

Another method of modulating the signal intensity in discrete steps, but not continuously as in the embodiment of FIG. 26, is by providing a multiple-pole switch in the transmission system circuit in such a manner that one or more batteries may be removed from the series circuit of the direct-current power source. If, for example, 1.5 volt batteries were utilized in the battery pack of the transmitting system, it would be possible to arrange for one, two, three, or more to be in the circuit at any given time — with corresponding influence on the intensity of the output signal at the receiver.

The telegraphic voice transmission system of the invention may also be used for the transmission of messages over long distances by the provision of independent circuits of such length as may be readily powered by an available D.C. source and arranging the output device — receiver — of one circuit to act as the input device — transmitter — of the next. Such arrangements are known in the telegraphic arts and may be readily mechanized in the devices of the invention by using the output membrane of one circuit in the chain as the input membrane of the next, that is by mounting a tap transducer on the upper surface of a horizontally arranged membrane driven by a solenoid coil.

It should also be appreciated that, for example, with the tap transducer of FIGS. 2 and 3, the cup-shaped housing may be partially filled with a liquid, such as water and one can speak directly into the liquid and one's voice is transmitted by the tap transducer.

It has also been observed in operating the tap transducer of the invention that during transmission of one's voice or sound, some "small particles or elements" of vibrations appear to be missed or skipped because of the speed of the voice or sound, and the uneven lengths of certain portions of the sound of the voice. It seems that the weighted bar of the tap transducer, while making and breaking contact at a very high rate of speed, misses certain particles or elements of vibration, and this occurs more so from direct speech or voice applied against the diaphragm of the tap transducer, than from pumps, motors, etc. which deliver an even, uninterrupted continuous sound where generally no such "misses" occur. However, such occurrences do not effect the operation of the invention, and rather only appear to render one's voice more hoarse sounding, as for example when one's speech is uneven in volume or loudness. Furthermore, such "misses" are only barely "detected" in the case of an ordinary speaker when it is pointed directly at a party; but when a horn type speaker is used, and is turned away from the party the natural echo of the room automatically overcomes the missing particles or elements, and the voice is received or heard loud and clear. The receiver placed against one's ear also receives the signal or voice loud and clear inasmuch as the ear piece has a metallic diaphragm which "slurs" all particles of the voice into one even sound, and therefor the missing particles or elements are not noticed or detected at all from the ear piece.

With reference to an embodiment of the invention involving a pair of tap transducers mounted in different positions on one diaphram (not shown), same acts as a single tap transducer, but such apparatus also slightly broadens the voice. Also, with a plurality of tap transducers on one line, a number of parties may speak at the same time, and all of the voices are received loud and clear on a horn type loudspeaker.

In FIG. 29, an alternate embodiment of the invention is illustrated. As shown therein, a shaft 900 is provided with a suitable weight or member fixedly secured thereto, such as a metallic cylinder 901. The shaft 900 is suitably mounted in a pair of passage means 902, 903 provided, respectively, in end blocks 904 and 905. Block 906 simply reinforces block 904 by "bearing" against same and exerting a slight "touching pressure", thus cutting down on the amount of vibration generated and aiding to eliminate any tendency for the device to over vibrate. Such a structure in the form of a "cross" provides for the delivery of a smoother sound without the need for adding an additional weight to the bar or shaft 900.

Suitable insulating means 907 and 908 are provided between the weight 901 and the end blocks 904 and 905, respectively. The device is also suitably spaced from the diaphram 910 by means of spacers 911 disposed about the fastening means 912 holding the device to the diaphragm 910 in order to allow the weight to freely move or vibrate in its bearing support blocks 904 and 905. In fact with the device as shown, the cylinder 901 is free to rotate with the shaft 900 and such rotation can be used in an intercom device of the invention to signal a receiver since the rotating shaft will generate a vibrating and ringing type of noise at the receiver. Accordingly, with a freely spinning or rotating shaft, one can "ring" another in an intercom system by spinning the shaft and weight without the need for any special bell elements as the device itself will serve both functions to alert the receiver side of the intercom as well as permit the transmission of voice or sound through such telegraphic principles.

Although the present invention has been described in some detail by way of illustration and example for purposes of clarity of understanding, it is understood that certain changes and modifications may be made within the scope of the invention.

I claim:

1. A transducer for converting a vibratory input into a train of direct-current pulses, comprising:
    a soundboard sensitive to said vibratory input;
    electrically conductive bearing means rigidly mounted on said soundboard and electrically insulated therefrom;
    a conductive switching bar having an axis loosely engaged in said bearing means, a sufficient clearance being provided between said conductive switching bar and said bearing means to permit movement of said conductive switching bar in directions transverse to the axis thereof; and conductor means for interconnecting said bearing means with a direct-current power sorce, whereby said train of pulses are generated by motion of said switching bar in said bearing means upon the application of a vibratory input to said soundboard.

2. A transducer as defined in claim 1, further comprising block means having a predetermined mass fixedly connected to said soundboard proximate to said bearing means for reducing vibrations of said soundboard and eliminating any tendency of the transducer to excessively vibrate, whereby the transducer provides improved sound quality.

3. A telegraphic device for the transmission of sound or speech signals, comprising:
 a source of direct-current electrical power;
 a soundboard;
 a pair of electrically conductive bearing supports mounted on said soundboard in a spaced, axially aligned relationship;
 insulating means, interposed between said pair of bearing supports and said soundboard;
 a conductive shaft resting upon said pair of bearing supports;
 restraint means, permitting said shaft to lift off said bearing supports but preventing complete disengagement therefrom;
 an elastic membrane;
 a solenoid adapted to deflect said elastic membrane;
 conductor means interconnecting one side of said source of direct-current power with one of said bearing supports, the other of said pair of bearing supports with one side of said solenoid, and the other side of said solenoid with other side of said direct-current power source; and
 interrupt means for making and breaking said conductor means; whereby, upon closing said interrupt means, a current flows through said conductive shaft and said solenoid and deflects said elastic membrane whenever said shaft is resting upon said supports and a sound pressure signal imposed upon said soundboard causes said shaft to vibrate in intermittent contact with said supports inducing a corresponding vibratory motion of said elastic membrane by the intermittent excitation of said solenoid, thereby recreating the sound pressure signal at the elastic membrane.

4. The telegraphic device defined in claim 3, wherein said source of direct-current power is a dry-cell battery.

5. The telegraphic device defined in claim 3, wherein said solenoid and said elastic membrane comprise a loudspeaker.

6. The telegraphic device defined in claim 3, wherein said bearing supports and said conductive shaft are constructed from an electrically semi-conductive material.

7. The telegraphic device defined in claim 6, wherein said semi-conductive material is carbon.

8. The telegraphic device defined in claim 3, further comprising weight means affixed to said conductive shaft.

9. The telegraphic device defined in claim 3, further comprising contactor means, interposed in said conductor means, whereby periodic actuation of said contactor means results in the transmission of discrete sound pulses through said elastic membrane.

10. A transducer for the detection of vibratory motion and the conversion of same to pulsed, audible sound signals, comprising:
 a base;
 a pair of upwardly open bearing supports, constructed from an electrically conductive material and mounted on said base in a spaced, axially aligned relationship;
 insulating means, interposed between said pair of bearing supports and said base;
 a conductive shaft resting upon said bearing supports;
 restraint means, permitting said shaft to lift off from said bearing supports but preventing complete disengagement therefrom;
 an elastic membrane;
 a solenoid adapted to deflect said membrane;
 a source of direct-current electrical power; and
 conductor means interconnecting one pole of said source of direct-current power with one of said bearing supports, the other of said pair of bearing supports with one side of said solenoid, and the other side of said solenoid with the other pole of said direct-current power source; whereby a current is caused to flow through said conductive shaft and through said solenoid, thereby deflecting said elastic membrane whenever said shaft is resting upon said supports, and on a vibratory signal imposed upon said base causing said shaft to vibrate in intermittent contact with said supports and inducing a corresponding vibratory motion in said elastic membrane by the intermittent excitation of said solenoid, thereby creating an audible signal in response to the vibratory excitation.

11. The transducer defined in claim 10, wherein said bearing supports and said conductive shaft are constructed from an electrically semi-conductive material selected from the group consisting of carbon, carbonaceous substances, graphite and mixtures thereof.

12. The transducer defined in claim 10, wherein said source of direct-current electrical power is a dry-cell battery.

13. A transducer for converting a vibratory input into a train of direct-current pulses, comprising:
 a diaphram sensitive to said vibratory input;
 a pair of electrically conductive supports rigidly mounted on said diaphram and electrically insulated therefrom and disposed in a spaced apart relationship;
 a plurality of electrically conductive, elongated switching elements lying upon said supports in parallel alignment, said switching elements being supported upon said supports in a manner to permit movements of said switching elements in directions transverse to the parallel directions of said switching elements; and
 conductor means for interconnecting said supports with a direct-current power source and a suitable detector for said train of pulses generated by motion of said switching elements upon said supports upon the application of vibratory input to said diaphram.

14. A communicating device for the transmission of sound or speech signals having a receiver and a transmitter comprising: a vibratory transmitter including a transducer adapted to convert sound or speech signals into a series of direct-current pulses; said transducer having soundboard means adapted to receive a vibratory input, electrically conductive bearing means mounted on said soundboard means and insulated therefrom, and an electrically conductive switching element loosely retained by said bearing means; electrical power means connected between said conductive bearing means and said receiver, whereby a current is caused to flow through said conductive switching element and to said receiver upon a vibratory signal imposed upon said soundboard supporting said transducer, thereby creating an audible signal at said receiver.

15. The communicating device according to claim 14, wherein said receiver is a speaker.

16. The communicating device according to claim 14, wherein said receiver is a solenoid or electromagnetic coil means acting upon an elastic or deflatable element.

* * * * *